June 10, 1969   H. ZAHLAUS   3,448,638
REVERSE PLANETARY GEAR
Filed March 17, 1967   Sheet 1 of 3

Inventor:
HELMUT ZAHLAUS
BY:
H. Edward Mesform

… … # United States Patent Office 3,448,638
Patented June 10, 1969

---

3,448,638
REVERSE PLANETARY GEAR
Helmut Zahlaus, Dornigheim, Germany, assignor to Firma P.I.V. Antrieb Werner Reimers KG., Bad Homburg vor der Hohe, Hesse, Germany
Filed Mar. 17, 1967, Ser. No. 624,073
Claims priority, application Germany, Mar. 22, 1966, Z 12,120
Int. Cl. F16h 1/32
U.S. Cl. 74—804      1 Claim

ABSTRACT OF THE DISCLOSURE

Reverse planetary gear, containing planetary wheels, the external teeth of which mesh with an outer wheel the teeth of which have an optionally fixed addendum circle radius. The teeth of the planetary wheels have an arcuate tooth addendum face satisfying the equations $$x = Rb \cdot \sin z - s \cdot \sin t + rk \cdot \sin \alpha$$
$$y = s(1 - \cos t) - Rb(1 - \cos z) - rk \cdot \cos \alpha$$

Figure 1:
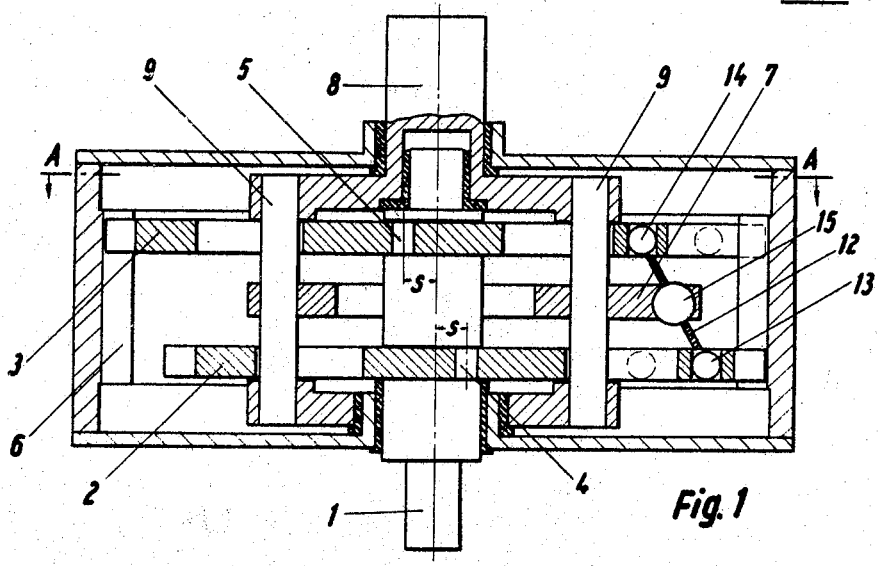

In these equations $Rb$ represents the rolling circle radius of the large wheel, $z$ the angle of rotation of the large wheel, $s$ an eccentric driving pin radius, $t$ the angle of rotation of the eccentric pin, $rk$ the addendum circle radius of the outer wheel gearing and $\alpha$ the pitch of the tangent of the tooth curve $$\left( tg\alpha = \frac{\sin t - \sin z}{\cos z - \cos t} \right)$$

to the point of contact of the tooth faces relatively to the $x$-axis.

---

The invention concerns a reverse planetary gear. Such planetary gears usually comprise an internally toothed outer wheel with which the planetary wheels, provided with external teeth and driven by an eccentric pin provided on the gear driving shaft, engage. The output drive is derived either from a shaft coupled with the planetary wheels or from the outer wheel, the third part of the gear remaining stationary.

Planetary gears of the above described construction have hitherto been usually provided with involute teeth which do not permit a path of contact exceeding 3 teeth, nor a tooth difference between the large wheel and planetary wheel of less than 4 teeth. The consequences of these restrictions are a comparatively large circular pitch, a large tooth circumference and a correspondingly large gear casing.

The object of the present invention is to provide a reverse planetary gear of the above-described design which can be made with smaller dimensions than known types for similar loadings. The invention resides in that the teeth of the planetary wheel which mesh with the outer wheel, the teeth of which have an optionally fixed addendum circle radius, have an arcuate tooth addendum face from the equations (a) $x = Rb \cdot \sin t + rk \cdot \sin \alpha$
(b) $y = s(1 - \cos t) - Rb(1 = \cos z) - rk \cdot \cos \alpha$ in which $Rb$ represents the rolling circle radius of the large wheel, $z$ the angle of rotation of the large wheel, $s$ an eccentric driving pin radius, $t$ the angle of rotation of the eccentric pin, $rk$ the addendum circle radius of the constructed large wheel gearing and $\alpha$ the pitch of the tangent of the tooth curve $$\left( tg\alpha = \frac{\sin t - \sin z}{\cos z - \cos t} \right)$$

of the external gearing relatively to the $x$ axis.

In this manner a planetary gear is provided, the teeth of which can be brought simultaneously into engagement with each other over a comparatively large range, up to a maximum angle of contact of 180°, so that the transmission of power is effected through a comparatively large number of teeth with considerable reduction of the specific tooth load. The circular pitch can thus be considerably reduced on the basis of identical torques to be transmitted, so that the diameter of the gear can also be greatly reduced. Due to the comparatively large number of the inter-engaged teeth (for example between 46 and 100) there is practically no noise, and the smaller surface load allows an oil film to be constantly retained between the teeth, even with thin oil. In this manner wear is considerably reduced, an improvement of efficiency to greater than 90% accompanying this reduction in wear. A further important advantage of a gear according to the invention also resides in that a gear reduction factor is possible between the large wheel and the planetary wheel consisting only of one tooth.

The coupling of the planetary wheels, rotating with the driving shaft, to the output drive member is effected, according to the present invention, by means of a bolt having two ball-ended pins and a spherical centre piece, the two ball pins of which are rotatably journalled and longitudinally displaceable in the planetary wheels and the centre piece of which is rotatable in the output drive member. In this manner the non-coincident circular movements of the planetary wheels caused by the eccentric are coupled to the fixed central circular motion of the output drive member, an automatic angle adjustment of the ball pin taking place with various eccentric positions. Only tangentially engaging circumferential forces and no rotating forces occur in the driving member, whereby an absolutely quiet power transmission is achieved with slight sliding motion and, consequently, only slight wear.

Figure 2:
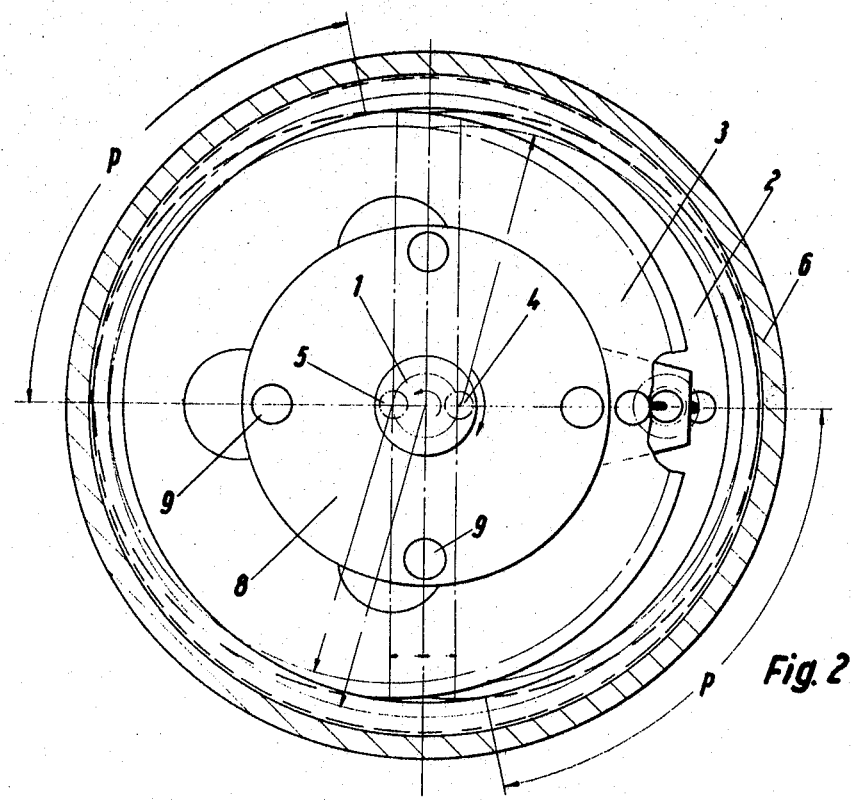
Figure 3:
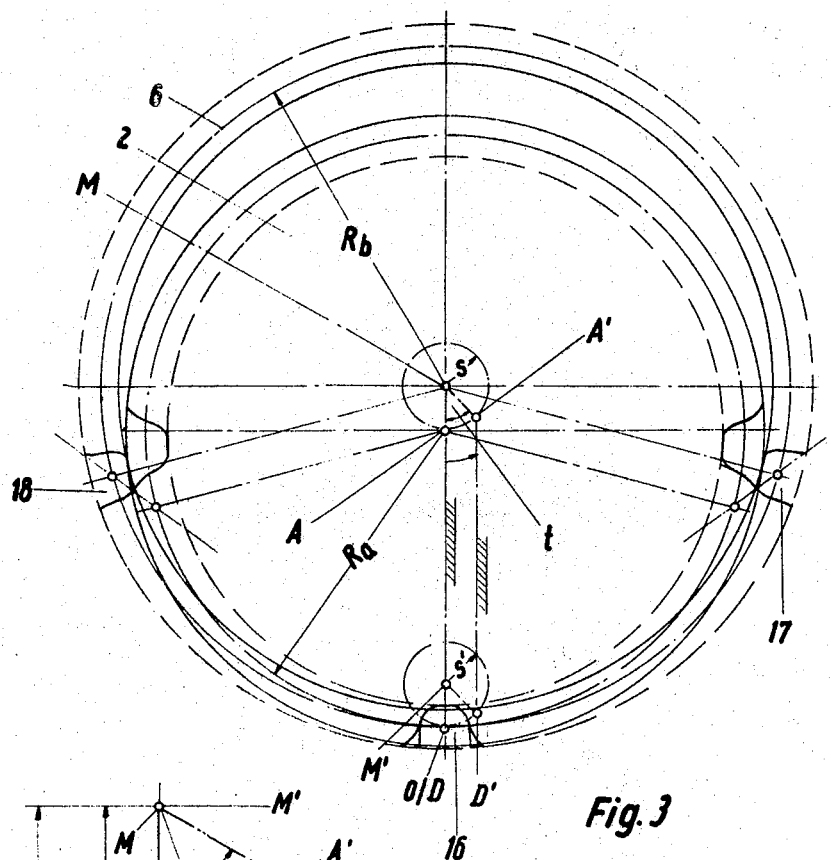
Figure 4:
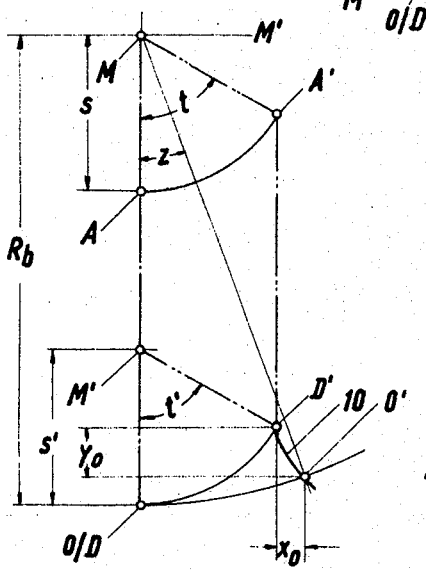
Figure 5:
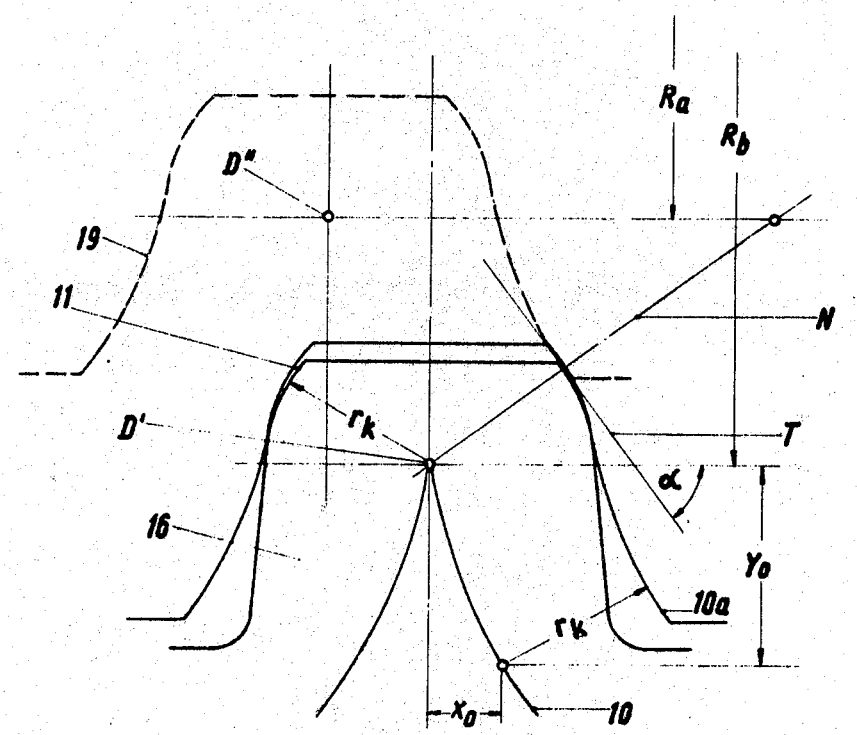

The invention is illustrated in the accompanying drawings, in which:
FIG. 1 shows a schematic view of a planetary gear according to the invention and viewed in section.
FIG. 2 is a section taken on the line A—A through FIG. 1.
FIGS. 3 to 5 show the development of a tooth face from the movements in the gear, the course of movement, in the gear in FIG. 3, being shown in a schematic overall view and in FIG. 4 in a magnified fragmentary illustration. FIG. 5 shows the development of the outline of the tooth from the dimensions given in FIGS. 3 and 4.

In FIGS. 1 and 2 the driving shaft is shown at 1 and planetary wheels at 2 and 3 which are actuated by the driving shaft 1 by way of eccentric pins 4 and 5 at a radius $s$, the said wheels engaging with an internally toothed large wheel 6. In the embodiment the large wheel 6 is stationary, in which case the output drive is effected by way of the output drive member 7 which is connected to the output drive shaft 8 by pins 9.

The tooth profiles of the external teeth of the planetary wheels 2 and 3, have an arcuate tooth addendum circle corresponding to the equations:

(a) $x = Rb.\sin z - s.\sin t + rk.\sin \alpha$
(b) $y = s.(1 - \cos t) - Rb(1 - \cos z) - rk.\cos \alpha$ in which $Rb$ represents the rolling circle radius of the internally toothed large wheel, $z$ the angle of rotation of the large wheel, $s$ the eccentric pin radius, $t$ the angle of rotation of the eccentric, $rk$ the addendum circle radius of the constructed large wheel gearing and $\alpha$ the pitch of the tangent of the tooth curve $$\left( \tan \alpha = \frac{\sin t - \sin z}{\cos z - \cos t} \right)$$

of the external gearing relative to the $x$ axis.

The determination of the outline of a tooth is shown schematically in FIGS. 3–5, in which the same parts are marked with the same reference numerals as in FIGS. 1 and 2. In this case, however, it is assumed that the planetary wheels are stationary and the output is obtained through the casing 6.

In the position of the gearing shown in FIG. 3, the tooth 16 of the large wheel 6 has maximum mesh with the planetary wheel 2, whilst the tooth 17 is at the beginning of contact and the tooth 18 at the end thereof. Thus, in the embodiment shown, there is an angle of contact 2p (see also FIG. 2) of slightly less than 180° for both planetary gears. The angle of contact, may, however, by a suitable selection of the tooth length, be increased up to 180° (for a planetary gear). Calculated relatively to the tooth 16, D stands for the point of contact on the pitch circle of the planetary wheel and O for the point of contact on the pitch circle of the large wheel 6. M represents the axis of the driving shaft 1 and A the axis of the eccentric pins 4, the radius of which gives the deflection $s$.

With the rotation of the eccentric pins through the angle $t$, the point A is displaced as far as the point A' (see FIG. 4), and the point D moves along a circle described round the point M' with eccentric radius $s'$ as far as the point D', and the point O moves as far as the point O'.

The two wheels are geared oppositely to each other. The sliding curve which is indicated by 10 in FIG. 4 shows an enlarged fragment of FIG. 3, on which curve each point corresponds to the equations (c) $x_0 = Rb.\sin z - s.\sin t$
(d) $y_0 = s.(1 - \cos t) - Rb.(1 - \cos z)$ This curve, which is shown enlarged in FIG. 5, represents the base curve for determining the final outline of the tooth.

The outline of the tooth is obtained after the determination of an arcuate addendum face 11 having any desired radius $rk$ of the large wheel internal gearing which simultaneously determines the root of the planetary wheel gearing, this being followed by the tooth face 10a corresponding in respect of its outline to the basic curve 10. The line T in this case indicates the tangent and the line N the normal to the point of contact of the tooth faces. The tangent T forms an angle $\alpha$ with the abscissa. This can be expressed graphically by the fact that an enclosing curve with radius $rk$ is described round the basic curve 10. Each point of the tooth face 10a thus satisfies the equations (a) $x = Rb.\sin z - s.\sin t + rk.\sin \alpha$
(b) $y = s.(1 - \cos t) - Rb(1 - \cos z) - rk.\cos \alpha$ from which, in contrast to involute gearing, a parallel shear gearing results, in which a positive line contacts between the teeth exists as far as the outlet. The parallel displacement at the end of contact, compared with the maximum contact, is shown in FIG. 5 by the broken line 19, with reference D'' which shows the position of the tooth 16 of the large wheel internal gear relative to a tooth of the external gear of the planetary wheel after an angle of rotation $xt$ at the emergence of the tooth.

The coupling of the planetary wheels 2 and 3 with the output drive member 7 is effected (FIG. 1) by means of a rod 12 having two ball ends 13 and 14 and a spherical centre piece 15, both balls 13 and 14 of which are rotatable and longitudinally displaceable in the planetary wheels 2 and 3 and the centre piece 15 of which is journalled to rotate in the output drive member 7.

The mode of operation of this transmission member is as follows:

The planetary wheels are displaced by a certain amount $s$ relative to the axis of the driving shaft 1, whereby non-coinciding circular motions are produced on the planetary wheels which are translated by the ball rod 12 into a movement of the output drive member concentric to the axis of the output drive. Since the arms of the rod are of the same length, these execute an undulating movement corresponding to the movements of the planetary gears determined by the eccentric pins which, however, is such that the spherical head 15 executes only a circular motion, tangential to the output drive member 7. FIG. 1 shows the position of the parts in broken lines after rotation through 180°. The drawing shows that the ball rod 12 has assumed a different angle relative to the output drive member 7 without a change in the position of the spherical head 15 relative to the output drive member 7 occurring also. Due to the mounting of the spherical head, an automatic angular adjustment of the ball rod takes place in which no rotating forces occur, so that the power transmission is absolutely quiet and uniform with very slight accompanying motion and therefore only slight wear. In addition to this, due to the ball rod transmission used, an automatic power compensation between the planetary gears and any change planetary wheels used occurs without an exchange of the rod members of the transmission being also necessary.

I claim:
1. A reverse planetary gear comprising an internally toothed outer wheel the teeth of which have an optionally determined addendum circle radius, externally toothed planetary wheels for engaging said outer wheel, a gear drive shaft, and eccentric pins on said gear drive shaft for moving said planetary wheels, said teeth of the planetary wheel having an arcuate tooth addendum face with an addendum circle radius derived from the equations:

(a) $x = Rb.\sin z - s.\sin t + rk.\sin \alpha$
(b) $y = s(1 - \cos t) - Rb(1 - \cos z) - rk.\cos \alpha$ in which $Rb$ represents the rolling circle radius of the outer wheel, $z$ the angle of rotation of the outer wheel, $s$ the radius of the eccentric pin, $t$ the angle of rotation of the eccentric pin, $rk$ the addendum circle radius of the constructed outer wheel gearing and $\alpha$ the pitch of the tangent of the tooth curve of the planetary wheel gearing relatively to the $x$ axis given by $$\tan \alpha = \frac{\sin t - \sin z}{\cos z - \cos t}$$

References Cited

UNITED STATES PATENTS

| | | | |
|---|---|---|---|
| 1,194,904 | 8/1915 | Wagner | 74—462 |
| 1,770,035 | 7/1930 | Heap et al. | 74—805 |
| 2,666,345 | 1/1954 | Amberg | 74—804 |
| 2,937,538 | 5/1960 | Worrall | 74—462 XR |
| 3,232,134 | 2/1966 | Kluwe et al. | 74—462 |
| 3,269,205 | 8/1966 | Niemann | 74—462 XR |

FOREIGN PATENTS 283,098  1/1928  Great Britain.

DONLEY J. STOCKING, *Primary Examiner.*

THOMAS C. PERRY, *Assistant Examiner.*

U.S. Cl. X.R.

74—462, 805